US008035256B2

(12) United States Patent
Beyer et al.

(10) Patent No.: US 8,035,256 B2
(45) Date of Patent: Oct. 11, 2011

(54) SWITCHING DEVICE AND A SYSTEM COMPRISING THE SAME

(75) Inventors: Stefan Beyer, Ebermannsdorf (DE); Peter Hauselt, Poppenricht (DE); Rainer Keil, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 431 days.

(21) Appl. No.: 12/224,406

(22) PCT Filed: Jan. 25, 2007

(86) PCT No.: PCT/EP2007/050717

§ 371 (c)(1), (2), (4) Date: Aug. 26, 2008

(87) PCT Pub. No.: WO2007/096223

PCT Pub. Date: Aug. 30, 2007

(65) Prior Publication Data

US 2009/0067110 A1 Mar. 12, 2009

(30) Foreign Application Priority Data

Feb. 27, 2006 (EP) .................................... 06003962

(51) Int. Cl.
*H02B 1/24* (2006.01)
*H02J 3/00* (2006.01)

(52) U.S. Cl. ........................................................ 307/113

(58) Field of Classification Search .................. 307/113
See application file for complete search history.

(56) References Cited

U.S. PATENT DOCUMENTS 5,866,954 A 2/1999 Daniel et al.
6,775,767 B2 * 8/2004 Hinrichs et al. .................. 713/1

FOREIGN PATENT DOCUMENTS

DE 197 22 898 A1 12/1998
JP 2001339372 A * 12/2001
JP 20011339372 A 12/2001

OTHER PUBLICATIONS

"System Hanbuch SIMOCODE-DP Motorschütz-und Steuergerät"; Nov. 29, 2000; Siemens AG; p. 1-13.

* cited by examiner

*Primary Examiner* — Rexford Barnie
*Assistant Examiner* — Hal Kaplan

(57) ABSTRACT

A switching device comprising switching means for switching at least one current phase between responsive current phase input and responsive current phase output, the switching device being suitable for switching electrical current of a power circuit of an electric motor, further comprises a first communication system interface for a first communication system, a second communication system interface for a second communication system, and a selecting unit adapted to select whether the switching device is a master or slave in relation to said second communication system.

4 Claims, 2 Drawing Sheets

SWITCHING DEVICE AND A SYSTEM COMPRISING THE SAME

CROSS REFERENCE TO RELATED APPLICATIONS

This application is the US National Stage of International Application No. PCT/EP2007/050717, filed Jan. 25, 2007 and claims the benefit thereof. The International Application claims the benefits of European application No. 06003962.5 filed Feb. 27, 2006, both of the applications are incorporated by reference herein in their entirety.

FIELD OF THE INVENTION

The invention relates to devices suitable for switching electrical current of a power circuit of an electric motor, the devices comprising switching means for switching at least one current phase between responsive current phase input and responsive current phase output.

BACKGROUND OF THE INVENTION

Switching devices are used in electrical engineering to switch electrical currents in different kinds of circuits. Switching of the power circuit of an electric motor requires, depending on the implementation, switching of one or three current phases. Because there may be relatively high currents involved, the generic class of switching devices comprises devices such as contactors, circuit breakers and overload relays. Each of these devices has means adapted to perform different aspects of switching-related functions. But in general, a switching device comprises switching means for switching at least one current phase between responsive current phase input and responsive current phase output, such as at least one movable contact piece and responsive stationary contact pieces for each phase, or corresponding electronical switching means.

It is desirable to be able to remotely monitor the actual status of a switching device, especially of its switching means, or to remotely change operation of a switching device, especially of its switching means. Particularly desirable this will be when switching devices are installed in a group thus comprising a plurality of switching devices there then being a larger number of power circuits to switch or a larger number of switching devices along one power circuit.

With an increasing number of switching devices the time and effort to manually monitor or control the switching devices increases so much that it easily becomes to a burdensome task.

To enable remote monitoring or changing of operation of a switching device, there are currently some implementations on the market, such as SIMOCODE® of the present applicant. The structure of the current implementation is schematically illustrated in FIGS. 1 and 2.

FIG. 1 shows a prior art gateway 110 connected to a group comprising four switching devices 120. A switching device 120 comprises switching means, known as such, for switching at least one current phase between responsive current phase input such as L1, L2, L3 for three phases and responsive current phase output such as T1, T2, T3 for three phases. Furthermore, the switching device 120 is suitable for switching electrical current of a power circuit of an electric motor.

FIG. 2 shows the system of FIG. 1 when the first communication system interface 112 of the gateway 110 has been connected to a first communication system 240, preferably via a responsive communication system interface 212 of the first communication system 240. The second communication system interface 116 of the gateway 110 is connected to a communication system interface 116 of a switching device 120 so that the gateway 110 and the switching device 120 may communicate to the second communication system 241. Further switching devices 120 may be connected to the second communication system 241 through their responsive communication system interfaces 116. The connections between the switching devices 120 and the second communication system 241 may be carried out by using bridging elements 115 connected to responsive second communication system interfaces 116 of the switching devices 120.

An on-site control device 230 may be provided, connectable to the second communication system 241 through a special adapter 235. The on-site control device 230 may be used for testing purposes, especially when system has not yet been connected to the first communication system 240, over which it could be monitored and controlled by the control system 200.

The gateway 110 takes care of routing messages from the second communication system 241 to the first communication system 240 which has a larger bandwidth than the second communication system 241. In this manner, the switching devices 120 can be kept as simple as possible, in particular because the second communication system 241 can be a very basic one requiring very little processing power at the processing units □C of the switching devices 120.

SUMMARY OF THE INVENTION

The present inventors consider the need to have a separate gateway to enable remote monitoring or changing of operation of at least one switching device as a handicap, since the gateway tends to increase the size and cost of an installation where the switching device is installed.

Furthermore, in the rise of a new switching device generation of the present applicant, where functionalities of several switching devices, especially contactors, circuit breakers and overload relays are to be implemented as one device unit only, the resulting devices then requiring more complex data communications, the present inventors have observed that the prior limitation of having a simple communication system between the switching devices and the gateway does not apply any more, since such a switching device will require a processing unit providing enough processing power.

Therefore, it is a first object of the present invention to make a dedicated gateway between the first and the second communication systems redundant.

This object can be achieved with a switching device as set out in the claims, namely by implementing to the switching device further a first communication system interface for a first communication system, a second communication system interface for a second communication system, and a selecting unit adapted to select whether the switching device is a master or slave in relation to said second communication system, whereby the result of the selection depends on whether the first communication system interface is connected to said first communication system. Since the functions of a gateway are now implemented in a switching device, there is no separate gateway needed any more.

A second object of the invention is to reduce the complexity of installing a system comprising at least two switching devices that enable being remotely monitored or their operation being remotely changed.

This object can be achieved with a system according to the claims, namely by having in the system a first switching device according to the first object of the invention, connected to a first communication system through said first communication system interface and to a second communication system through said second communication system interface, and at least one second switching device according to the first object of the invention, connected to said second communication system through said second communication system interface. Since the switching devices in the system now comprise communication system interfaces for the first and the second communication system, the installation can be made relatively easy since it does not matter any more which one of the devices is to be connected to the first communication system, thus enabling in the assembling, retail and installation practices to have a smaller number of switching devices produced or be kept in stock.

Furthermore, the redundancy of the system may be increased since problems that would arise by failure of the only element comprising gateway functionalities may be better avoided.

The dependent claims describe various advantageous aspects of both objects of the invention.

The remote monitoring of the switching device, or of other switching devices connected to the switching device through the second communication system interface may be carried out advantageously if the switching device further comprises an information providing unit adapted to send information over actual status of the switching device, or information received through said second communication system interface, to said first communication system interface.

The remote changing of operation of the switching device, or of other switching devices connected to the switching device through the second communication system interface may be carried out advantageously if the switching device further comprises a command translation unit adapted to translate a command received through said first communication system interface to a translated command and to send it to said second communication system interface.

Particularly simple installation can be provided, if the selecting unit is adapted to select that the switching device is a master device in relation to said second communication system in response to the first communication system interface being connected to said first communication system, or that the switching device is a slave device in relation to said second communication system in response to said first communication system interface not being connected to the first communication system.

Testing of the installed switching devices can be facilitated by enabling the use of an on-site control device. A particularly advantageous manner to connect such an on-site control device can be achieved, if the switching device further comprises a state checking unit adapted, in response to detecting an on-site control device, to allow providing information received through said second communication system interface to said on-site control device, or to accept commands received from said on-site control device. In this manner, a switching device that acts as master in relation to the second communication system can deliver information to the on-site control device, instead of or in addition to delivering said information to a remote control system through the first communication system.

If in a system according to the second objective of the invention, the first switching device is connected to a second switching device through a bridging element placed to responsive second communication system interfaces, the connecting of the switching devices can be made relatively simple for the electrician taking care of the installing work.

BRIEF DESCRIPTION OF THE DRAWINGS

In the following, different embodiments of the invention are described by way of examples shown in FIGS. 3 to 5 of the accompanying drawings, of which.

Same reference numerals refer to similar structural elements throughout the Figures.

DETAILED DESCRIPTION OF INVENTION

Figure 1:
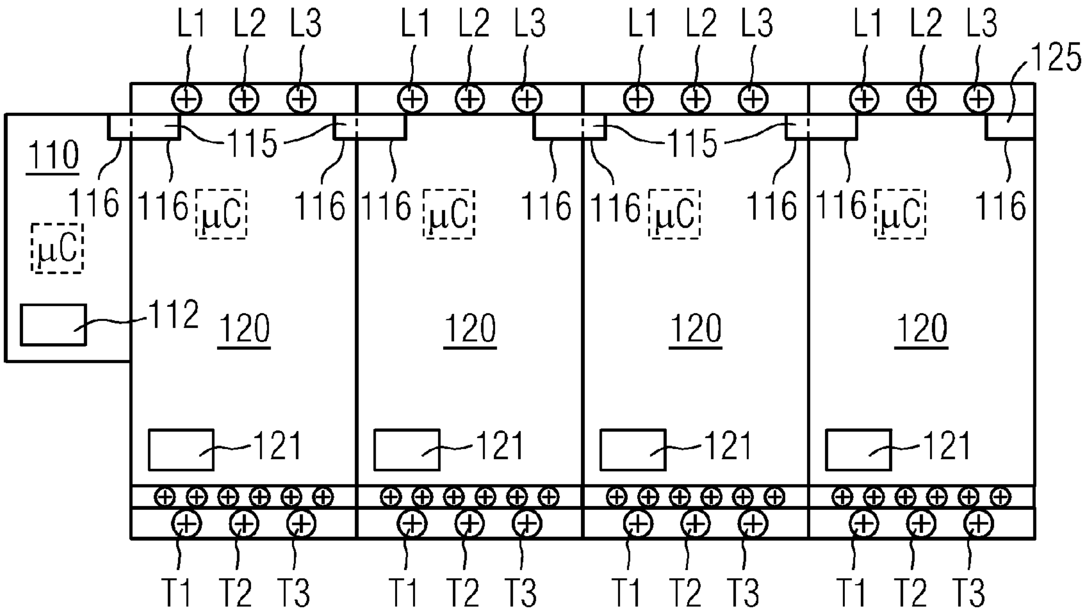
FIG 1 (PRIOR ART)
FIG. 1 shows a prior art gateway connected to a group of four switching devices.
Figure 3:
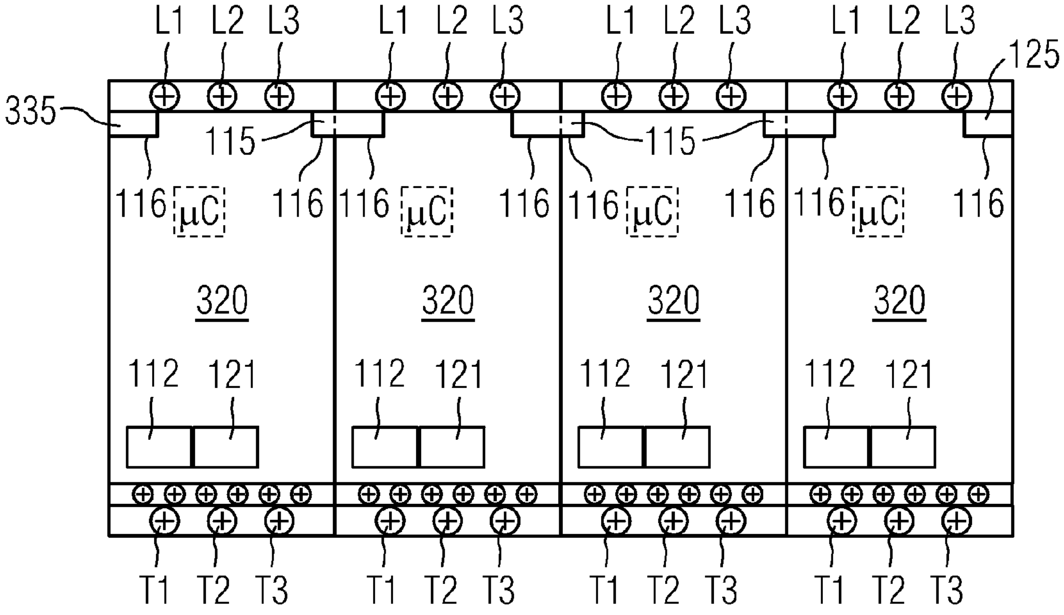
FIG. 3 shows a group of switching devices according to the first object of the invention, connected to form a group of four switching devices.
Figure 2:
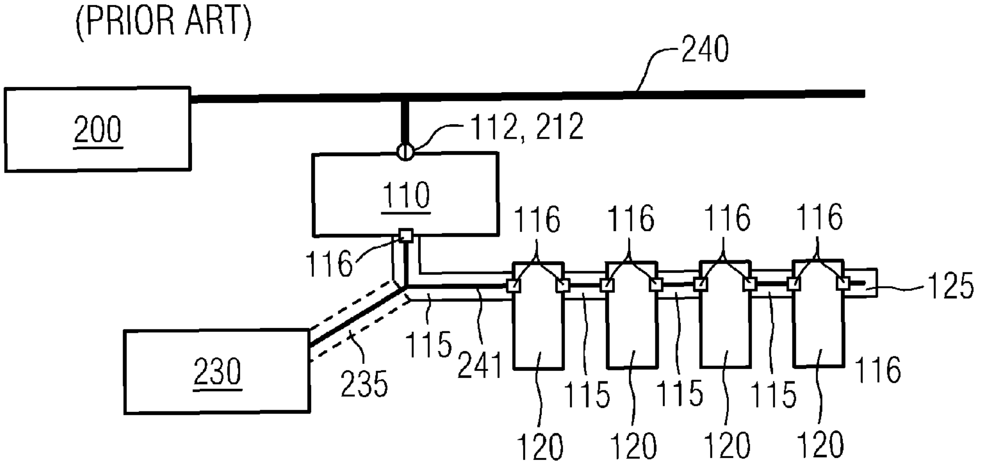
FIG 2 (PRIOR ART)
FIG. 2 shows the system of FIG. 1 when the gateway has been connected to the first communication system and the switching devices have been connected to the gateway through the second communication system.

FIG. 3 shows a group of switching devices 320 according to the first object of the invention, connected to form a group of four switching devices.

Each of the switching devices 320 comprises switching means for switching at least one current phase between responsive current phase input L1, L2, L3 and responsive current phase output T1, T2, T3, the switching means as such known from the prior art. The switching devices 320 comprise means adapted to switch electrical current of a power circuit of an electric motor, preferably in three phases but an implementation where only one current phase is switched, can be possible.

The switching device 320 comprises an auxiliary supply 121 that preferably comprises two terminals over which a supply voltage can be set. The supply voltage is used to supply operating current for the switching device 320. If the supply voltage disappears, the switching device 320 breaks the power circuit. The switching off of the supply voltage is usually used in order to indicate that an emergency off command was given.

Each of the switching devices 320 further comprises an integrated gateway 410 comprising a first communication system interface 112 for a first communication system 240, a second communication system interface 116 for a second communication system 241, and a selecting unit, such as a piece of software code executable in a processing unit μC and when being executed, adapted to select whether the switching device 320 is a master or slave in relation to said second communication system 241.

The selecting unit may furthermore comprise a selecting element 405, such as a switch or relay that is activated as soon as the first communication system 240 is detected, or as soon as the communication system interface 212 of the first communication system 240 is connected to the first communication system interface 112 of the switching device 320. Alternatively or in addition, the selecting element 405 can be implemented as a piece of software code executable in the processing unit μC and when being executed, adapted to activate the selecting unit.

To enable more flexible connecting, each of the switching devices 320 preferably comprises two interfaces 116 for the second communication system 241.

Figure 4:
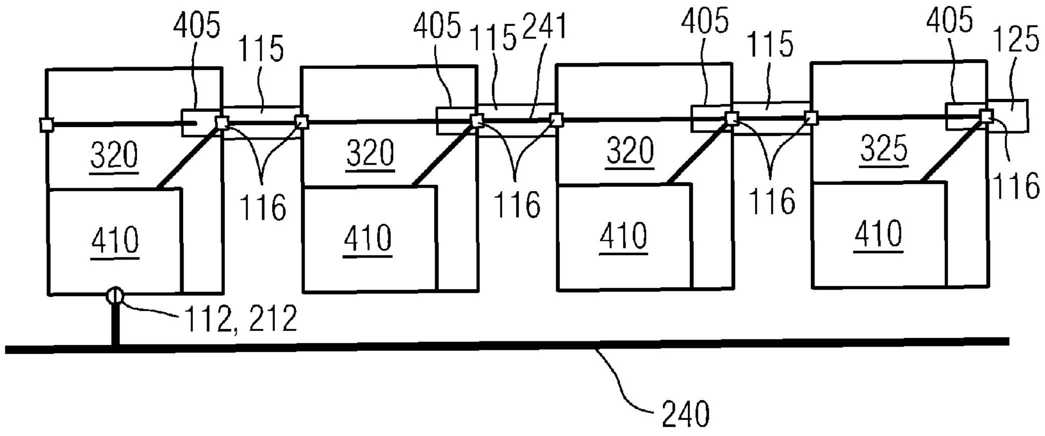
FIG. 4 shows the system of FIG. 3 when a first switching device is connected to the first communication system and the other switching devices have been connected to the first switching device through the second communication system.

FIG. 4 shows the system of FIG. 3 when a first switching device 320 is connected to the first communication system 240 and the other switching devices 320 have been connected to the first switching device 320 through the second communication system 241.

The switching devices 320 may further comprise an information providing unit, such as a piece of software code executable in the processing unit μC and when being executed, adapted to send information including an actual status of the switching device 320, or information received through said second communication system interface 116, to said first communication system interface 112.

The switching device 320 may further comprise a command translation unit, such as a piece of software code executable in the processing unit μC and when being executed, adapted to translate a command received through said first communication system interface 112 and to send it to said second communication system interface 112.

The said selecting unit is preferably adapted to select that the switching device 320 is a master device in relation to said second communication system 241 in response to the first communication system interface 112 being connected to said first communication system 240. In particular, the selecting unit may be adapted to perform the selecting step automatically.

Instead of this or in addition to it, the selecting unit can further be adapted to select, preferably automatically, that the switching device 320 is a slave device in relation to said second communication system 241 in response to said first communication system interface 112 not being connected to the first communication system 240.

In the system of FIG. 4, the first switching device 320 is connected to the first communication system 240 through the first communication system interface 112 and to the second communication system 241 through the second communication system interface 116. The other switching devices 320 are connected to the second communication system 241 through their second communication system interfaces 116.

In particular, the connections between the switching devices 320 via which the second communication system 241 is implemented can be carried out by using bridging elements 115 that are placed between the respective second communication system interfaces 116. The last second communication system interface 116 of the last switching device 320 may be provided with a terminator 125, for example, to avoid reflections in the second communication system 241.

The first switching device 320 may be the master with respect to said at least one second switching device 320. Preferably, the selecting unit is adapted to select this function automatically.

By integrating the gateway functionality to the switching devices 320, the master switching device 320 may get all information from the slave switching devices 320 connected to the second communication system 241. In the master switching device 320 a logic may be automatically activated, enabling the communication with an on-site control device 230, regardless of the remote control system 200.

Figure 5:
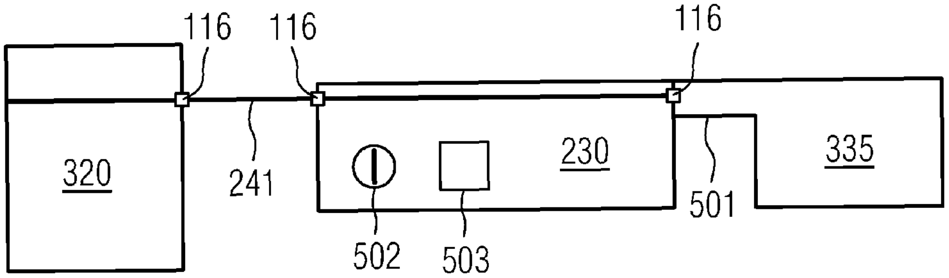
FIG. 5 illustrates how an on-site control device or a key can be connected to the second communication system.

FIG. 5 illustrates how an on-site control device 230 or a key 335 can be connected to the second communication system 241.

To enable this, each of the switching devices 320 may further comprise a state checking unit, such as a piece of software code executable in the processing unit μC and when being executed, adapted, in response to detecting an on-site control device 230, to allow providing information received through said second communication system interface 116 to said on-site control device 230, or to accept commands received from said on-site control device 230.

Access control to the on-site control device can be implemented by providing a key 335 that is connectable to the second communication system 241 like a switching device 320. This contributes to the security of the installation, since improper or unauthorized use can be prevented.

Through the master switching device 320, it becomes possible for the on-site control device 230 to interrogate every switching device 320 individually or groupwise. By having an insertable key 335, access rights to the on-site control device 230 can be set. The state checking unit of the master switching device 320 then checks whether access rights are to be granted or not for the on-site control device 230. The key 335 can be a memory component, a hardware solution or a hardware coding. In particular, the key 335 is an electronic key; the key 335 can also be a dongle.

If the key 335 is an electronic key, it may be connected to the first switching device 320, preferably said second communication system 241 or through said on-site control device 320 by placing a communication system interface 501 of the key 335 to responsive communication system interface 116 of the first switching device 320 or of the on-site control device 320. In this manner, the key 335 can be directly connected to the second communication system 241, preferably through second communication system interface 116 of said on-site control device 320 or of one of the switching devices 320.

A testing of switching devices 320 without the first communication system 240 is also possible, since the master switching device 320 takes control. Additionally, through the second communication system 241 an on-site control device 230 can control or monitor every switching device 230 connected to the second communication system 241.

The state checking unit may thus be adapted to allow providing said information or to accept said commands only after having detected a valid key 335.

It may be possible to connect the on-site control device 230 directly to the switching device 320. This is meaningful with test controls when a switching device 320 is taken into use, since the electrician can test the functioning directly and without connecting the system or the switching device 320 to a remote control system 200. In this manner, possible error messages can be read on site.

For the case that all switching devices 320 of the system are to be tested, the on-site control device 230 may be connected to the second communication system 241 over which the on-site control device 230 may communicate with the remote control system 200, with the master switching device 320, or with the slave switching devices 320. Control and diagnose commands that are sent by the on-site control device 230 can thus be monitored by the remote control system 200.

The on-site control device 230 may comprise an input means 502 to receive user input, the on-site control device 230 then forwarding them as commands to the master switching device. Furthermore, the on-site control device 230 may comprise output means 503 for displaying the status of the on-site control device 230 to the operator.

In order to reduce the number of variants for switching devices 320, preferably all switching devices 320 comprise a selecting unit, first communication system interface 112, and preferably one or two second communication system interfaces 116. The selecting unit has thus basically a function of a gateway between the first communication system 240 and the second communication system 241. The communication with the remote control system 200 takes place over the first communication system 240 and thus via the switching device 320 acting as master relative to the second communication system 241.

The first communication system 240 is preferably a system bus or a field bus enabling connecting the system to a remote control station. Alternatively, it may be a point-to-point communication system or a wireless communication system. In particular, non-limiting examples of such communication systems are the AS-Interface, IO-Link, PROFIBUS, PROFINET or the Ethernet. Non-limiting examples of wireless communication systems comprise WLAN (especially as specified in the IEEE 802.11 specifications), BLUETOOTH® or ZigBee (such as specified in the IEEE 802.15.4 specification).

The second communication system 241 can be any master-slave bus. In particular, non-limiting examples of such communication systems are SIMOconnect, SIMATIC® backplane bus system, or the ET200S backplane bus system.

The first and the second communication system interfaces 112, 116 comprise physical access unit or units to access the first or second communication system 240, 241, respectively, and responsive protocol units such as software code executable in the processing unit □C and when being executed, adapted to communicate with the first or second communication system 240, 241 over the physical access unit or units. The physical access unit therefore comprises communication unit for communication over a wireless or wired communication medium, such as a connector/socket or an antenna.

The switching device 320 is preferably a low-voltage switching device, adapted to switch currents over voltages up to 1000 volts, in particular in the range of 380 volts to 690 volts.

The switching device 320 may in particular be a motor starter comprising one or more of the following elements: contactor, circuit breaker, overload relay. In particular, the switching device 320 preferably comprises all these three elements in a common housing. The motor starter being then suitable for switching three current phases of a power circuit of an electric motor.

The invention claimed is:

1. A switching device for switching at least one current phase between a responsive current phase input and a responsive current phase of a power circuit of an electric motor, comprising:

a first communication system interface for a first communication system, the switching device communicating with a remote control system over the first communication system;

a second communication system interface for a second communication system, the second communication system being a master-slave bus;

a selecting element that selects whether the switching device is a master device or a slave device in relation to the second communication system, depending on whether the first communication system interface is connected to the first communication system, whereby the selecting element has a function of a gateway between the first communication system and the second communication system: and a state checking unit that, when an on-site control device is detected, allows providing information received through the second communication system interface to the on-site control device, or accepts commands received from the on-site control device, wherein the state checking unit is adapted to allow providing the information or to accept the commands only after having detected a valid key.

2. The switching device according to claim 1, further comprising:

an information providing unit that sends information including an actual status of the switching device, or information received through the second communication system interface, to the first communication system interface.

3. A system comprising:

a first switching device for switching at least one current phase between a responsive current phase input and a responsive current phase of a power circuit of an electric motor, the switching device comprising:

a first communication system interface for a first communication system, a second communication system interface for a second communication system, and a selecting element that selects whether the switching device is a master device or a slave device in relation to the second communication system, depending on whether the first communication system interface is connected to the first communication system, wherein the first switching device is connected to the first communication system through the first communication system interface and to the second communication system through the second communication system interface, wherein a second switching device is connected to the second communication system through a second communication system interface of the second switching device, wherein the second switching device is connected to the first switching device via a bridging element placed between the second communication system interfaces of the first and second switching devices, wherein the first switching device is a master device with respect to the second switching device, wherein the first switching device comprises a state checking unit that, when an on-site control device is detected, allows providing information received through the second communication system interface to the on-site control device, or accepts commands received from the on-site control device, wherein the on-site control device is connected to the first switching device through the second communication system, and wherein the state checking unit allows providing the information or accepts the commands only after having detected a valid key, and the key is connected to the second communication system.

4. The system according to claim 3, wherein the key is connected to the second communication system through the second communication system interface of the on-site control device or of one of the switching devices.

* * * * *